(12) United States Patent
Kondo

(10) Patent No.: US 7,136,188 B2
(45) Date of Patent: Nov. 14, 2006

(54) COLOR REPRODUCTION CHARACTERISTIC DISPLAY APPARATUS, AND COLOR REPRODUCTION CHARACTERISTIC DISPLAY PROGRAM STORAGE MEDIUM

(75) Inventor: Hirokazu Kondo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1027 days.

(21) Appl. No.: 09/964,496

(22) Filed: Sep. 28, 2001

(65) Prior Publication Data

US 2002/0036787 A1    Mar. 28, 2002

(30) Foreign Application Priority Data

Sep. 28, 2000   (JP)   ............... 2000-296677

(51) Int. Cl.
*G06F 15/00*   (2006.01)
(52) U.S. Cl. .................. 358/1.9; 358/504; 358/518; 358/519; 358/527; 382/167
(58) Field of Classification Search ................ None
See application file for complete search history.

*Primary Examiner*—Twyler Lamb
*Assistant Examiner*—Benjamin O. Dulaney
(74) *Attorney, Agent, or Firm*—Sughrue Mion, PLLC

(57) ABSTRACT

A color reproduction characteristic display apparatus displays a color chart. When a mouse cursor is placed on any one of a plurality of color patches constituting the color chart, there are displayed a coordinate value in a CMYK color space associated with the color patch designated by the mouse cursor and a color difference to determine two coordinates on a color space of L*a*b*, said two coordinates being associated with the coordinate value and two sorts of devices as well.

15 Claims, 7 Drawing Sheets

COLOR REPRODUCTION CHARACTERISTIC DISPLAY APPARATUS, AND COLOR REPRODUCTION CHARACTERISTIC DISPLAY PROGRAM STORAGE MEDIUM

BACKGROUND OF THE INVENTION

1. Field of the Invention

The present invention relates to a color reproduction characteristic display apparatus for displaying color reproduction characteristics defined in accordance with a device for mediating between image data and an image, for example, an input device for converting an image to image data, such as a color scanner and a digital still camera, and an output device (including a display device for outputting or displaying an image on a display screen, such as a display unit and the like) for outputting an image in accordance with image data, such as a printing machine and a printer, and a color reproduction characteristic display program storage medium storing a color reproduction characteristic display program which causes a computer to operate as the color reproduction characteristic display apparatus.

2. Description of the Related Art

Hitherto, it is performed that an input device, for example, a color scanner or an electronic scale camera, is used to take an image (hereinafter, it is referred to as an original image) in to obtain image data, so that an reproduced image of the original image is obtained in accordance with the image data by a printing machine or a printer, or on a display screen. In this case, there are determined a color reproduction characteristic (profile) associating a color on the original image with a color on the image data, according to the input device, and a color reproduction characteristic (profile) associating a color on the image data with a color on the reproduced image, according to the output device such as a printing machine and a printer, and image data obtained from the original image by the input device is converted into image data suitable for the output device in accordance with both the color reproduction characteristics, so that the reproduced image is outputted in accordance with the image data for the output device. This feature makes it possible to obtain the reproduced image coincident with the original image in color.

The same matter as the above will occur between output devices. Next, there will be explained an example.

Hitherto, when a printing machine is used to perform a color image printing, it is performed that prior to the printing, a color printer and the like is used to create a proof image which is intended to be similar in color to an image to be printed by the printing machine. When the printer creates the proof image, detected are a color reproduction characteristic (a printing profile) describing a relationship between image data and a color of the actual printed matter, associated with a printing machine of interest, and a color reproduction characteristic (a printer profile) describing a relationship between image data and a color of an image to be actually printed, associated with a printer. Image data for printing is converted into image data for printers in accordance with the printing profile and the printer profile, so that a proof image is created in accordance with the image data for printers thus converted. Thus, it is possible to create a proof image that is coincident with the actual printed matter in color.

In order to obtain a proof image that is coincident with the actual printed matter in color in the manner as mentioned above, there is a need to determine with great accuracy color reproduction characteristics (profiles) of the input device and the output device. When the color reproduction characteristics (profiles) are determined, for example, in case of the input device, a color chart, in which color patches are arranged, is read by the input device and then converted into image data, and coordinates (CYMK values, or RGB values) of color spaces (a device color space: for example, a CMYK color space consisting of four colors of cyan (C), magenta (M), yellow (Y) and black (K), or an RGB color space consisting of three colors of red (R), green (G) and blue (B))) on the image data are determined. And the same color chart is measure by a spectrocolorimeter to determine coordinates (L*a*b* values or XYZ values) of a colorimetry color space (for example, L*a*b* color spaces or XYZ color spaces), and the coordinates on the device color space are associated with the coordinates on the colorimetry color space. Thus, it is possible to determine the color reproduction characteristics (profile) of the input device.

When the color reproduction characteristics (profile) of the output device is determined, image data, which corresponds to a color chart wherein color patches are arranged, is created, the output device outputs the color chart in accordance with the image data thus created, the color chart is measured by the spectrocolorimeter, and the coordinates of the color space (the device color space) on the image data are associated with the coordinates of the colorimetry color space. Thus, it is possible to determine the color reproduction characteristics (profile) of the output device.

The color reproduction characteristics of the input device and the output device are carefully determined, and the image data are converted in accordance with those color reproduction characteristics, nevertheless, various errors and main causes of fluctuations will cause a phenomenon in which colors are delicately different between the original image and the reproduced image, or between the printed matter and the proof image.

Under the circumstance as mentioned above, when it is evaluated as to whether a color of an image outputted from a color printer for example is properly reproduced as to a color of an original image which is read by a color scanner in form of image data, or when it is evaluated as to whether a color of an image outputted from a color printer is coincident with a color of an image on a printed matter, according to the earlier technology, a print output is actually carried out, and a weight is put onto only a point that the printed output image is evaluated through observer's comparisons of a reproduced image by the print output with the original image, or of a proof image by the print output with an image obtained through printing using a printing machine. It is a present state that there is found no suitable one as a tool for objectively scrutinizing and evaluating points as to how what colors are coincident with or different from one another.

SUMMARY OF THE INVENTION

In view of the foregoing, it is an object of the present invention to provide a color reproduction characteristic display apparatus suitable for objectively examining and evaluating points as to how two images (for example, an original image and a reproduced image, or a printed matter and a proof image), which are obtained through mutually different two types of device, are coincident with or different from one another, and a color reproduction characteristic display program storage medium.

To achieve the above-mentioned object, the present invention provides a first color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

an image display section for displaying a patch arrangement image in which there is arranged a plurality of patches associated with the coordinates of the first color space; and a patch designation section for designating a desired patch from among the plurality of patches constituting the patch arrangement image displayed on said image display section in accordance with an operation, wherein said image display section displays in addition to the patch arrangement image a coordinate value on the first color space associated with the patch designated by said patch designation section and information as to a distance between two coordinates on the second color space, said two coordinates being associated with said coordinate value and two sorts of devices as well.

The first color reproduction characteristic display apparatus as mentioned above displays the patch arrangement image consisting of a plurality of patches, and when a desired patch is designated from among the plurality of patches constituting the patch arrangement image, the first color reproduction characteristic display apparatus displays a coordinate value (each value of CMYK or RGB) on a color space, for example, of CMYK or RGB, associated with the patch designated, and information as to a distance between two coordinates on the second color space, said two coordinates being associated with said coordinate value and two sorts of devices as well, wherein as the typical example of the distance, there is raised a color difference between two color patches in which image data having values of the CMYK or the RGB is used so that two sorts of devices (for example, a printing machine and a color printer) output color patches. According to this feature, only the designation of the patch on the screen makes it possible an operator to know an extent of coincidence or difference in color as to the patch, and thus possible to objectively examine and evaluate on data a degree of coincidence or inconsistency of color reproduction characteristics between two devices.

In the color reproduction characteristic display apparatus according to the present invention as mentioned above, it is preferable that said image display section further displays coordinate values of the two coordinates on the second color space.

Specifically, according to the color reproduction characteristic display apparatus of the present invention, there are displayed not only a difference between two color patches outputted from a printing machine and a color printer but also L*a*b* values or XYZ values of those two color patches, and thereby providing more effective information as to examination and evaluation on data a degree of coincidence or inconsistency of color reproduction characteristics between two devices.

To achieve the above-mentioned object, the present invention provides a second color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

a distance range designation section for designating a distance range on the second color space in accordance with an operation; and an image display section for displaying a patch arrangement image in which there is arranged a plurality of patches associated with the coordinates of the first color space, and in addition, with respect to each of a plurality of color patches constituting the patch arrangement image, for displaying information as to whether a distance between two coordinates on the second color space, said two coordinates being associated with said coordinate value and two sorts of devices as well, is within the distance range designated by said distance range designation section.

The second color reproduction characteristic display apparatus as mentioned above displays the patch arrangement image in which there is arranged a plurality of patches, and in addition, with respect to each of a plurality of color patches constituting the patch arrangement image, displays information as to whether a distance (typically, a color difference) between two coordinates is within the designated distance range. This feature makes it possible for an operator to grasp an extent of coincidence or difference in patch (color), and thus possible to objectively examine and evaluate on data a degree of coincidence or inconsistency of color reproduction characteristics between two devices.

To achieve the above-mentioned object, the present invention provides a third color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

an image display section for displaying a patch arrangement image in which there is arranged a plurality of patches associated with the coordinates of the first color space, and in addition, with respect to each of a plurality of color patches constituting the patch arrangement image, for displaying a coordinate value on the first color space associated with the patch designated by said patch designation section and information as to a distance between two coordinates on the second color space, said two coordinates being associated with said coordinate value and two sorts of devices as well, with numerical values in order of the distance.

The third color reproduction characteristic display apparatus as mentioned above displays the patch arrangement image in which there is arranged a plurality of patches, and in addition, with respect to each of a plurality of color patches constituting the patch arrangement image, displays a coordinate value (typically, CMYK values or RGB values) on the first color space and information as to a distance (typically color difference) between two coordinates on the second color space, said two coordinates being associated with said coordinate value and two sorts of devices as well, with numerical values in order of the distance (color difference). This feature makes it possible to perform detailed examination and evaluation on data through the comparison of the patches on the patch arrangement image.

In the third color reproduction characteristic display apparatus as mentioned above, it is preferable that said image display section displays with numerical values coordinate values of the two coordinates on the second color space with respect to each of a plurality of color patches constituting the patch arrangement image.

In the manner as mentioned above, in the event that the image display section displays with numerical values not only information (for example, a color difference) as to the distance between two coordinates, but also coordinate values (for example, L*a*b* values or XYZ values) of the two coordinates with respect to a plurality of color patches constituting the patch arrangement image. This feature makes it possible to increase objective data and thereby performing further detailed examination and evaluation on data.

In any of the first, second and third color reproduction characteristic display apparatuses according to the present invention as mentioned above, it is preferable that said image display section displays, as the patch arrangement image, images simulating color chart images for evaluation of color reproduction characteristics inputted or outputted by said two sorts of devices.

In the patch arrangement image displayed by the image display section, while there is no need that a format of the above-mentioned color chart is always simulated, in the event that the above-mentioned color chart is simulated, there is displayed a patch arrangement image, of which an image is coincident with a color chart inputted through an input device or outputted from an output device. This feature makes it possible to construct the color reproduction characteristic display apparatus in form of an apparatus, which is easy to handle and easy to observe.

To achieve the above-mentioned object, the present invention provides a first color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

an image display section for displaying a patch arrangement image in which there is arranged a plurality of patches associated with the coordinates of the first color space; and a patch designation section for designating a desired patch from among the plurality of patches constituting the patch arrangement image displayed on said image display section in accordance with an operation, wherein said image display section displays in addition to the patch arrangement image a coordinate value on the first color space associated with the patch designated by said patch designation section and information as to a distance between two coordinates on the second color space, said two coordinates being associated with said coordinate value and two sorts of devices as well.

The color reproduction characteristic display program stored in the first color reproduction characteristic display program storage medium of the present invention causes a computer to operate as the first color reproduction characteristic display apparatus when the program is installed in the computer and is executed. The color reproduction characteristic display program includes the aspects corresponding to all of the aspects of the first color reproduction characteristic display apparatus of the present invention.

To achieve the above-mentioned object, the present invention provides a second color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

a distance range designation section for designating a distance range on the second color space in accordance with an operation; and an image display section for displaying a patch arrangement image in which there is arranged a plurality of patches associated with the coordinates of the first color space, and in addition, with respect to each of a plurality of color patches constituting the patch arrangement image, for displaying information as to whether a distance between two coordinates on the second color space, said two coordinates being associated with said coordinate value and two sorts of devices as well, is within the distance range designated by said distance range designation section.

The color reproduction characteristic display program stored in the second color reproduction characteristic display program storage medium of the present invention causes a computer to operate as the second color reproduction characteristic display apparatus when the program is installed in the computer and is executed. The color reproduction characteristic display program includes the aspects corresponding to all of the aspects of the second color reproduction characteristic display apparatus of the present invention.

To achieve the above-mentioned object, the present invention provides a third color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

an image display section for displaying a patch arrangement image in which there is arranged a plurality of patches associated with the coordinates of the first color space, and in addition, with respect to each of a plurality of color patches constituting the patch arrangement image, for displaying a coordinate value on the first color space associated with the patch designated by said patch designation section and information as to a distance between two coordinates on the second color space, said two coordinates being associated with said coordinate value and two sorts of devices as well, with numerical values in order of the distance.

The color reproduction characteristic display program stored in the third color reproduction characteristic display program storage medium of the present invention causes a computer to operate as the third color reproduction characteristic display apparatus when the program is installed in the computer and is executed. The color reproduction characteristic display program includes the aspects corresponding to all of the aspects of the third color reproduction characteristic display apparatus of the present invention.

DETAILED DESCRIPTION OF PREFERRED EMBODIMENTS

Embodiments of the present invention will be described with reference to the accompanying drawings.

Here, by way of example, there will be particularly explained a display for evaluating what extent a color on a proof image outputted by a color printer is coincident with or different from a color on a printed matter obtained by a printing machine.

Figure 1:
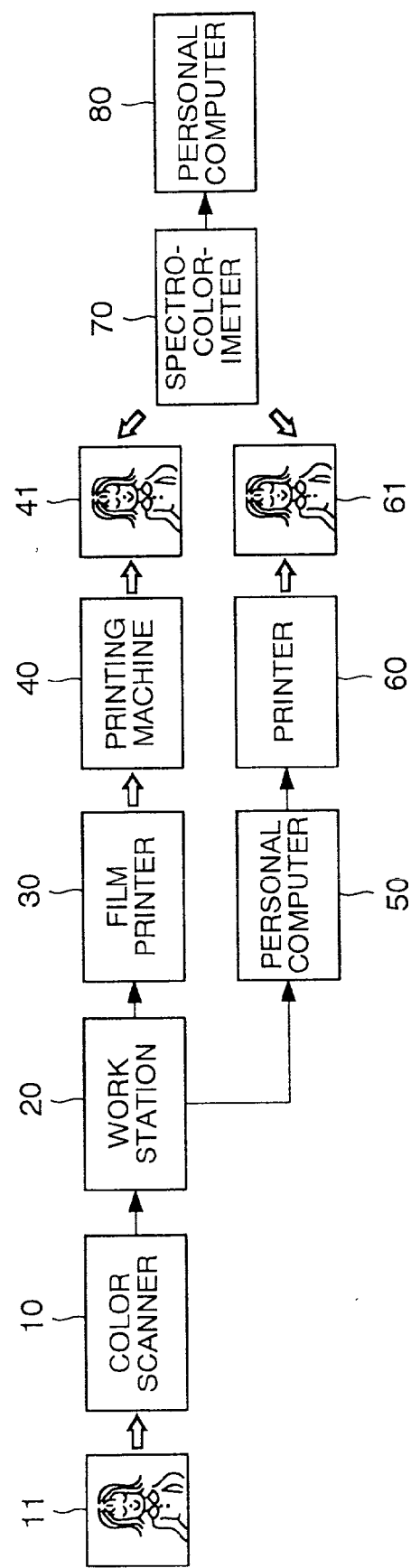
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image 11 and produces color separation image data of four colors of CMYK representative of the original image 11. The image data of four colors of CMYK is fed to a workstation 20. The workstation 20 performs an electronic page make-up in accordance with image data entered by an operator to create image data representative of an image for printing. The image data for printing is fed, in case of performing printing, to a film printer 30 so that print film original plates for CMYK plates are produced in accordance with the fed image data.

A machine plate is produced from the print film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a printer 60 is used to produce a proof image 61 in accordance with a manner as set forth below, so that a finish of the printed image 41 is confirmed beforehand.

When the proof image is produced, image data, which is created by the electronic page make-up on the workstation 20, is fed to a personal computer 50. Here, the image data fed to the personal computer 50 is description language data described in a so-called PDL (Page Description Language). The personal computer 50 converts the image data of the description language into image data of four colors of CMYK developed to a bit map by a so-called RIP (Raster Image Processor). The image data of four colors of CMYK is substantially the same as the image data for printing fed to the film printer 30.

The image data for printing of four colors of CMYK is converted into image data of four colors of CMYK suitable for a printer 60 through referring to a color conversion definition having a format of LUT (Look Up Table) inside the personal computer 50. The printer 60 receives the image data for the printer of four colors of CMYK and produces the proof image 61 in accordance with the image data for the printer of four colors of CMYK.

A degree of coincidence of colors between the image 41 obtained through printing by the printing machine 40 and the proof image obtained by the printer 60 is determined by the color conversion definition inside the personal computer 50. The color conversion definition is created for each printing condition of printers.

While FIG. 1 shows only one printing machine, it is acceptable that there is provided a plurality of printing machines, or alternatively it is acceptable that while only one printing machine is provided, a plurality of printing conditions, which are mutually different from one another, are prepared, so that the color conversion definition is created in accordance with the plurality of printing conditions including a difference of printing machines. In other words, the color conversion definition is created in accordance with a combination of the respective printing condition and a type of printer (when a single printer is provided and a plurality of printing conditions are provided, the respective printing condition is concerned). A spectrocolorimeter 70 and a personal computer 80, which are shown in FIG. 1, are related to a creation of the color conversion definition.

In this manner, the proof image is produced and confirmed, so that the finish of printing is confirmed beforehand.

An aspect as an embodiment of the present invention in the proof image producing system shown in FIG. 1 resides in processing contents to be executed inside the personal computer 80. Hereinafter, there will be described the personal computer 80.

Figure 2:
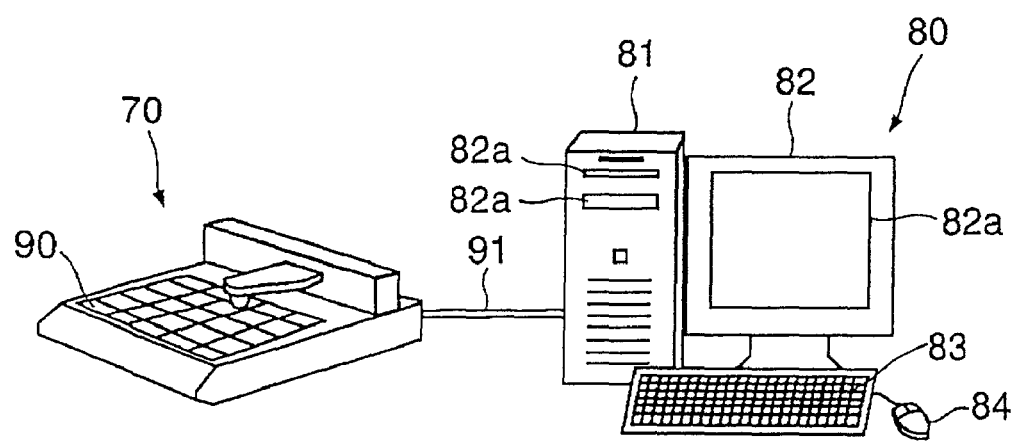
FIG. 2 is a perspective view of a spectrocolorimeter and a personal computer, which are shown in FIG. 1 with blocks.
Figure 3:
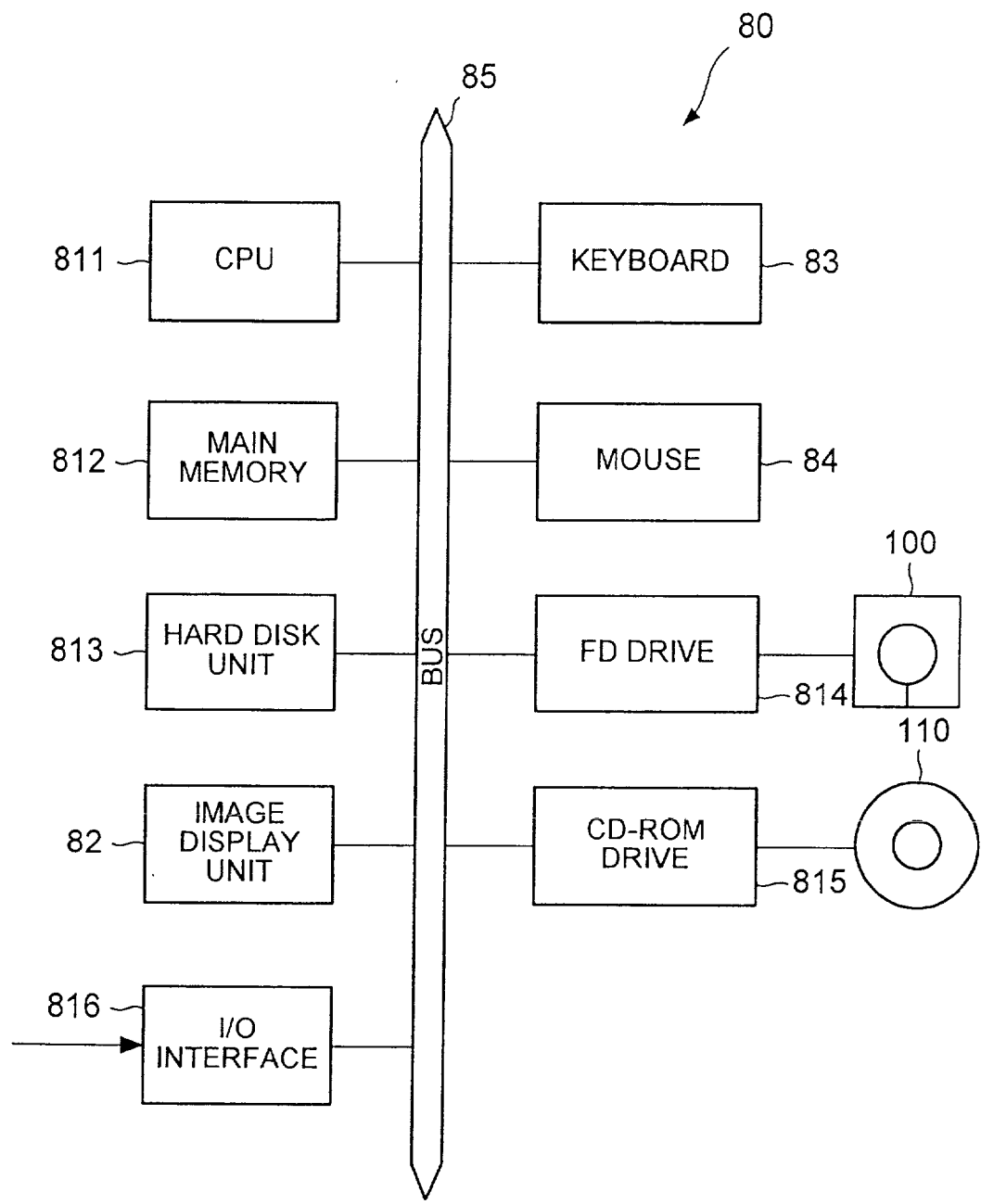
FIG. 3 is a hardware structural view of the personal computer.

FIG. 2 is a perspective view of a spectrocolorimeter 70 and a personal computer 80, which are shown in FIG. 1 with blocks. FIG. 3 is a hardware structural view of the personal computer 80.

A color chart 90, in which a plurality of color patches is arranged, is put on the spectrocolorimeter 70 to measure calorimetric values (here L*a*b*) for each of the plurality of color patches constituting the color chart 90. Colorimetric data representative of the colorimetric values for each of the color patches obtained through measurement by the spectrocolorimeter 70 is fed via a cable 91 to the personal computer 80.

The color chart 90 is produced through printing by the printing machine 40 shown in FIG. 1 or through printing out by the printer 60. The personal computer 80 knows color data (coordinates on the device color space; values of CMYK or RGB) associated with the color patches constituting the color chart 90, and produces a printing profile and a printer profile in accordance with color data for the color patches of the color chart 90 and the calorimetric data obtained by the spectrocolorimeter 70. In this respect, the detail description will be described later. Next, there will be described the hardware structure of the personal computer 80.

The personal computer 80 comprises, on an external appearance, a main frame unit 81, an image display unit 82 for displaying an image on a display screen 82a in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82a, the icon and the like being displayed on the position on the display screen 82a. The main frame unit 81 has a floppy disk mounting slot 81a for mounting a floppy disk, and a CD-ROM mounting slot 81b for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a floppy disk 100 mounted thereon, a CD-ROM drive 815 for accessing a CD-ROM 110 mounted thereon, an I/O interface 816 connected to the spectrocolorimeter 70 (cf. FIG. 1 and FIG. 2), to receive colorimetry data from the spectrocolorimeter 70, and a printer interface 817 to transmit image data to the printer 60. These various types of elements are connected via a bus 85 to the image display unit 82, the keyboard 83 and the mouse 84.

The CD-ROM 110 stores therein a color reproduction characteristic display program for causing the personal computer 80 to operate as a color reproduction characteristic display apparatus. The CD-ROM 110 is mounted on the CD-ROM drive 815 so that the color reproduction characteristic display program, which is stored in the CD-ROM 110, is up-loaded on the personal computer 80 and is stored in the hard disk unit 813.

Incidentally, functions of the creation of the profile and the color conversion definition, which will be described hereinafter, are not the subjects of the present invention, and it is assumed that programs and the like necessary for implementing the functions are already installed in the personal computer 80.

When the embodiment of a color reproduction characteristic display program of the present invention is stored in the CD-ROM 110, the CD-ROM 110 corresponds to the embodiment of a color reproduction characteristic display program storage medium of the present invention. When the color reproduction characteristic display program of the present invention is up-loaded and stored in the hard disk unit 813, the hard disk unit 813 storing the color reproduction characteristic display program also corresponds to the embodiment of a color reproduction characteristic display program storage medium of the present invention. When the color reproduction characteristic display program of the present invention is down-loaded onto the floppy disk 100, the floppy disk 100 storing the color reproduction characteristic display program also corresponds to the embodiment of a color reproduction characteristic display program storage medium of the present invention.

Next, there will be described a method of creating a color conversion definition constructed in the personal computer 80.

Here, first, a printing profile is produced

Dot % data for four colors of CMYK from the workstation shown in FIG. 1 are sequentially changed as 0%, 10%, . . . , 100%, so that a color chart based on the dot % data thus generated is created in accordance with the above-mentioned printing procedure. While the image 41 shown in FIG. 1 is not an image representative of a color chart, the spectrocolorimeter 70 is used to measure color patches constituting a color chart, it is assumed that the same color chart as the color chart 90 shown in FIG. 2 is printed instead of the image 41. Thus, it is possible to construct a printing profile representative of the association between coordinate values on the color space for four colors of CMYK and coordinate values on the colorimetric color space.

Figure 4:
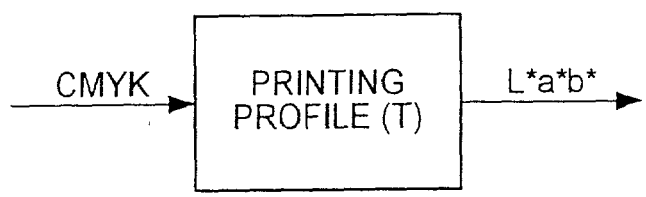
FIG. 4 is a conceptual view of a print profile.

FIG. 4 is a conceptual view of a printing profile.

The printing profile receives image data defined by CMYK (an example of the first color space referred to in the present invention), and converts the image data of CMYK into image data defined by L*a*b* (an example of the second color space referred to in the present invention).

Next, the printer profile is created.

A method of creating the printer profile is the same as the method of creating the printing profile excepting the point that an output device for outputting a color chart is a printer but not a printing machine. That is, the personal computer 50 show in FIG. 1 sequentially changes dot % data for four colors of CMYK as 0%, 10% . . . , 100% for each color, and transmits the dot % data thus generated to the printer 60. The printer 60 outputs the color chart in accordance with the dot % data. While the image 61 shown in FIG. 1 is not an image representative of a color chart, the spectrocolorimeter 70 is used to measure color patches constituting a color chart, it is assumed that the same type of color chart as the color chart created by printing of the printing machine 40 for creating the printing profile is outputted instead of the image 61. Thus, it is possible to construct a printer profile representative of the association between coordinate values on the color space for four colors of CMYK and coordinate values on the colorimetric color space (L*a*b*).

Figure 5:
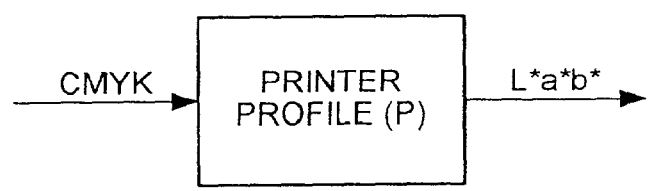
FIG. 5 is a conceptual view of a printer profile.

FIG. 5 is a conceptual view of a printer profile.

The printer profile receives dot % data for four colors of CMYK and converts the dot % data for CMYK into colorimetry data of L*a*b*. Here, P denotes a printer profile (a rectification printer profile) for converting the dot % data for CMYK into the colorimetry data of L*a*b*. $p^{-1}$ denotes a printer profile (an inversion printer profile) for converting the colorimetry data of L*a*b* into the dot % data for CMYK.

While it has been explained that the printer 60 outputs an image in accordance with the dot % data for four colors of CMYK, it is acceptable that a printer, which outputs an image in accordance with data for RGB for example, is used to create a printer profile suitable for the printer in such a manner that the personal computer 50 generates data defined by the RGB space to output a color chart.

However, here, there is explained a case where the printer 60, which outputs an image in accordance with the dot % data for four colors of CMYK, is used.

Figure 6:
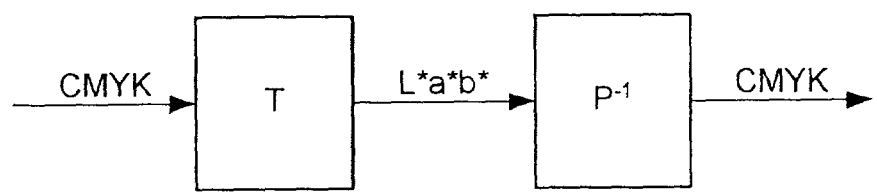
FIG. 6 is a view of a combination profile in which a print profile and a printer profile are combined.

FIG. 6 is a view of a combination profile in which a printing profile and a printer profile are combined.

A printing profile T is used to convert the dot % data for CMYK for printing into calorimetric data of L*a*b*. Next, the inversion printer profile P⁻is used to convert the colorimetry data of L*a*b* into the dot % data for CMYK for a printer. Thus, it is possible that the printer 60 outputs a proof image, which is the same as printing in color, in accordance with the dot % data for CMYK for printing thus generated. The combination profile, which comprises the printing profile T and the inversion printer profile $P^{-1}$, is a color conversion definition for converting a CMYK color space for printing into a CMYK color space for a printer.

The color conversion definition, as mentioned above, is created by the personal computer 80 constituting the print and proof image creating system shown in FIG. 1, and then is installed in the personal computer 50 constituting the print and proof image creating system shown in FIG. 1. Image data described in PDL, which is fed from the workstation 20, is converted into image data for CMYK, and then the image data for CMYK is converted into image data for CMYK for a printer using the color conversion definition, so that the printer 60 is used to output an image in accordance with the image data for CMYK for a printer, and thereby creating a proof image for an image of printing.

It is not always necessary that the personal computer 80 shown in FIG. 1 creates up to the combination file. It is acceptable that the personal computer 80 creates the printing profile or the printer profile, and the printing profile or the printer profile thus created is fed to the personal computer 50 to create the combination profile.

Next, there will be explained a display mode by the personal computer 80.

Figure 7:
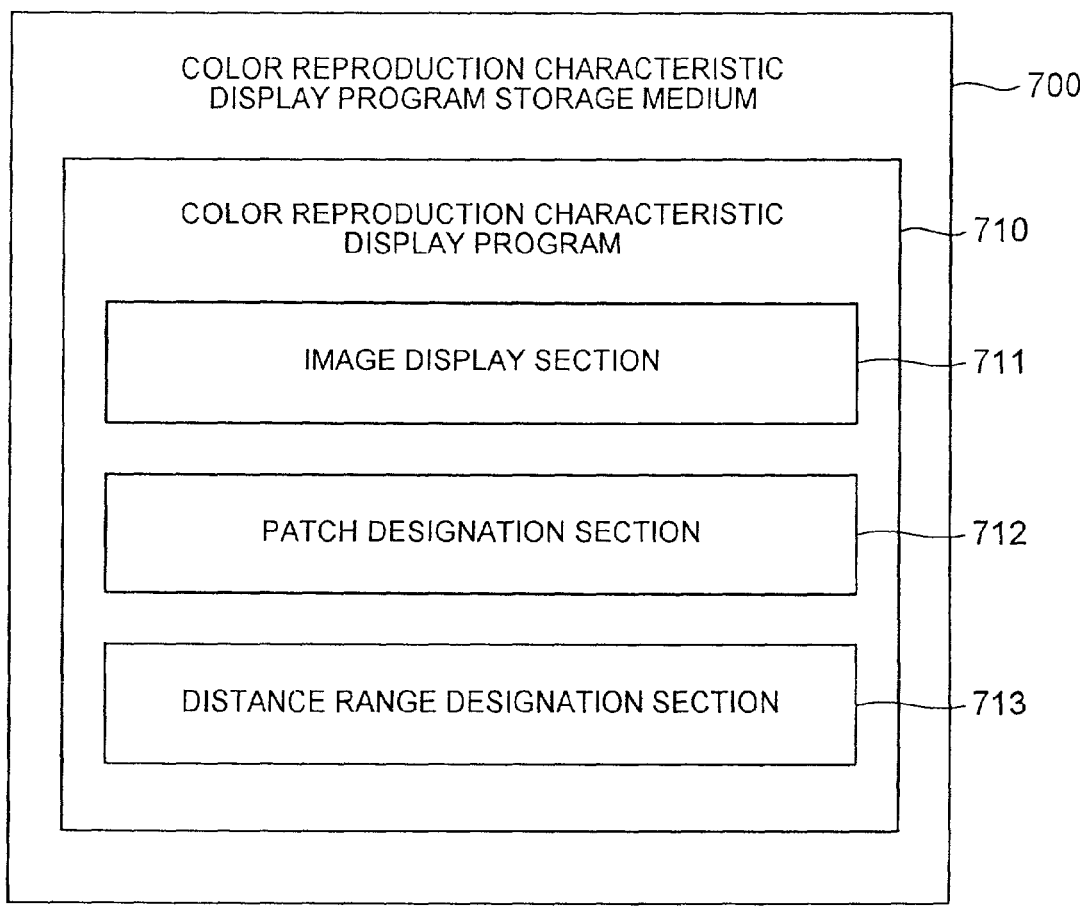
FIG. 7 is a view showing an embodiment of a color reproduction characteristic display program storage medium of the present invention.

FIG. 7 is a view showing an embodiment of a color reproduction characteristic display program storage medium of the present invention. A color reproduction characteristic display program storage medium 700 typically shows the CDROM 110, the floppy disk 100, the hard disk device 813 and so on, which store therein the color reproduction characteristic display program 710, in the structure shown in FIG. 3.

The color reproduction characteristic display program 710, which is stored in the color reproduction characteristic display program storage medium 700, comprises an image display section 711, a patch designation section 712 and a distance range designation section 713. Operations of those program elements will be described later.

Figure 8:
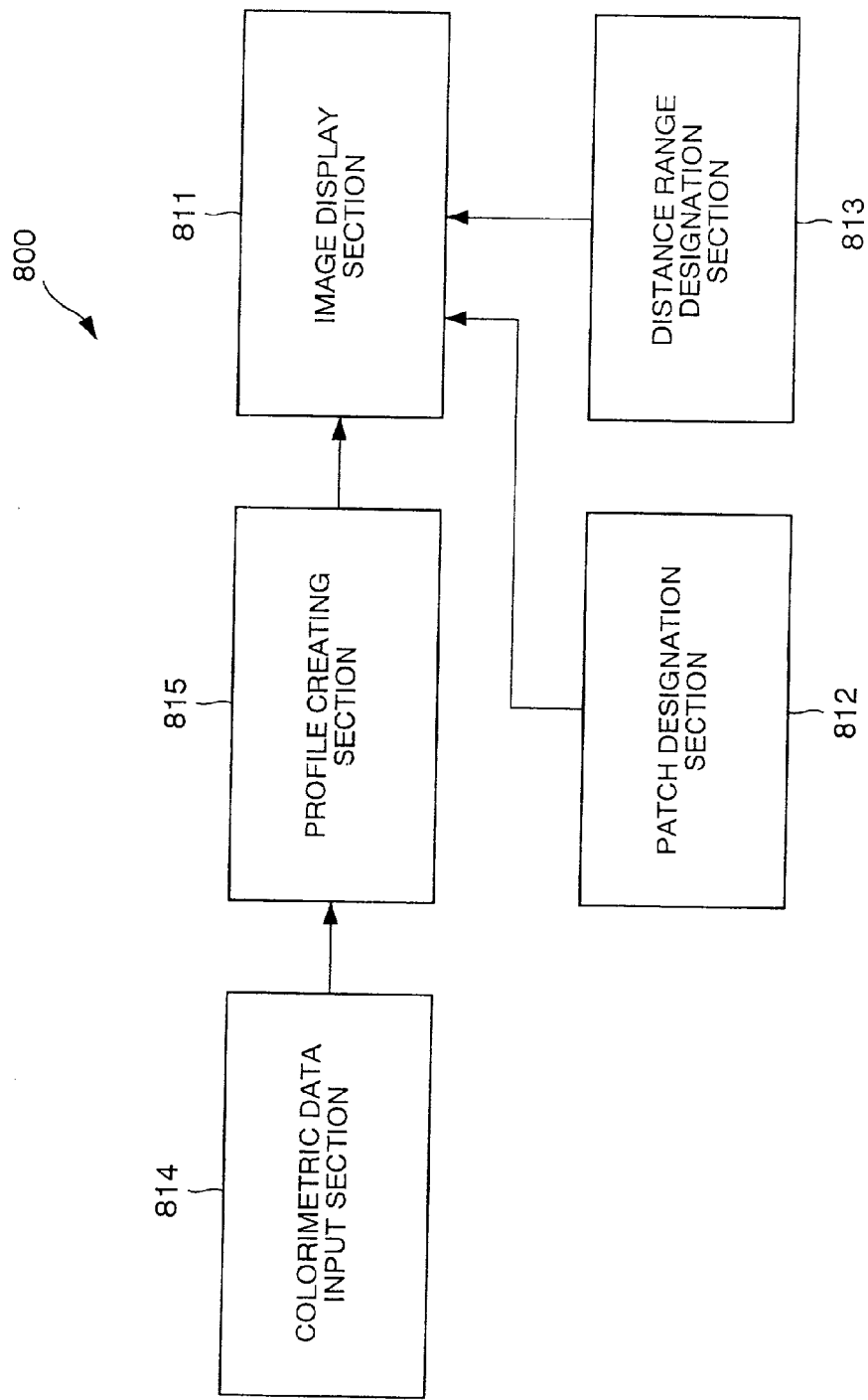
FIG. 8 is functional block diagram of a profile creation and data display apparatus including an embodiment of a color reproduction characteristic display apparatus of the present invention, which is constructed in the personal computer shown in FIGS. 1 and 2.

FIG. 8 is functional block diagram of a profile creation and data display apparatus including an embodiment of a color reproduction characteristic display apparatus of the present invention, which is constructed in the personal computer 80 shown in FIGS. 1 and 2.

A profile creation display apparatus 800 comprises a calorimetric data input section 814, a profile creating section 815, an image display section 811, a patch designation section 812 and a distance range designation section 813. Of the structure elements of the profile creation display apparatus 800 in FIG. 8, the image display section 811, the patch designation section 812 and the distance range designation section 813 are constructed by a compound of the personal computer 80 shown in FIGS. 1 and 2 and the color reproduction characteristic display program 710 shown in FIG. 710. The image display section 811, the patch designation section 812 and the distance range designation section 813 of the profile creation display apparatus 800 shown in FIG. 8 correspond to the image display section 711, the patch designation section 712 and the distance range designation section 713 of the color reproduction characteristic display program 710 shown in FIG. 7, respectively. It is noted that while the same names are applied, the structural elements in FIG. 8 denote a compound of the hardware and the software, and the structural elements of the color reproduction characteristic display program 710 shown in FIG. 7 denote only a portion of the application software.

Hereinafter, there will be explained the structural elements of the profile creation display apparatus 800 shown in FIG. 8. It is noted that this explanation implies the explanation for the structural elements of the color reproduction characteristic display program 710 shown in FIG. 7 too.

A calorimetric data input section 814 of the profile creation display apparatus 800 shown in FIG. 8 has a function of receiving the calorimetric data obtained by the spectrocolorimeter 70 shown in FIGS. 1 and 2 and transferring the same to the profile creating section 815. The calorimetric data input section 814 mainly corresponds to the I/O interface 816 of the personal computer 80 shown in FIG. 3 on a hardware basis.

The profile creating section 815 shown in FIG. 8 has a function of creating the printing profile and the printer profile which are explained referring to FIGS. 4 and 5, and is implemented by installing a profile creating program (not illustrated) in the personal computer 80. The profile creating section 816 shown in FIG. 8 corresponds to the CPU 811 shown in FIG. 3 on a hardware basis.

The image display section 811 basically displays a patch arrangement image in which there is arranged a plurality of patches associated with coordinates (CMYK values) on the CMYK color space, and the detailed data related to the plurality of patches constituting the patch arrangement image. The patch arrangement image to be displayed is one simulating color charts used in the system shown in FIG. 1, for example, a color chart to be printed by the printing machine 40 for creation and evaluation of a printing profile, a color chart to be printed by the printer 60 for creation and evaluation of a printer profile, a color chart to be read by the color scanner 10 for creation and evaluation of a profile of the color scanner 10, which are the same format as one another. And as compared with those color charts, the patch arrangement image has the same structure as those color charts in the arrangement order and the arrangement position. For this reason, hereinafter, the patch arrangement image to be displayed by the image display section 811 is also referred to as the color chart, and the patches arranged on the color chart are referred to as the color patches. A plurality of color patches constituting the displayed color chart is displayed with colors associated with CMYK values belonging to the color patches. While the image display section 811 displays detailed data as to the color patches constituting the color chart, as well as the color chart, the detailed data will be described later. The image display section 811 mainly corresponds to the image display unit 82 of the personal computer 80 shown in FIGS. 2 and 3 on a hardware basis. Concrete display modes of the image display section 811 will be described later.

The patch designation section 812 designates in accordance with an operation a desired color patch from among a plurality of color patches constituting the displayed color chart displayed by the image display section 811. The patch designation section 812 mainly corresponds to the mouse 84 of the personal computer 80 shown in FIGS. 2 and 3 on a hardware basis.

When the patch designation section 812 designates an arbitrary color patch image on the color chart, the image display section 811 displays together with the color chart CMYK values related to the designated color patch, L*a*b* values wherein the CMYK values are converted through referring to the printing profile created by the profile creating section 815, L*a*b* values wherein the CMYK values are converted through referring to the printer profile created by the profile creating section 815, and a difference (a color difference) between those two types of L*a*b* values.

The distance range designation section 813 designates a distance range on an L*a*b* space, that is, a range of the color difference in accordance with an operation.

When the distance range designation section 813 designates the distance range (the range of the color difference), the image display section 811 displays together with the color chart information as to whether a distance (a color difference) between two types of L*a*b* values, wherein on each of the color patches constituting the color chart CMYK values belonging to the associated color patch are converted by both the printing profile and the printer profile, is within a designated distance range (within a designated range of color difference).

Figure 9:
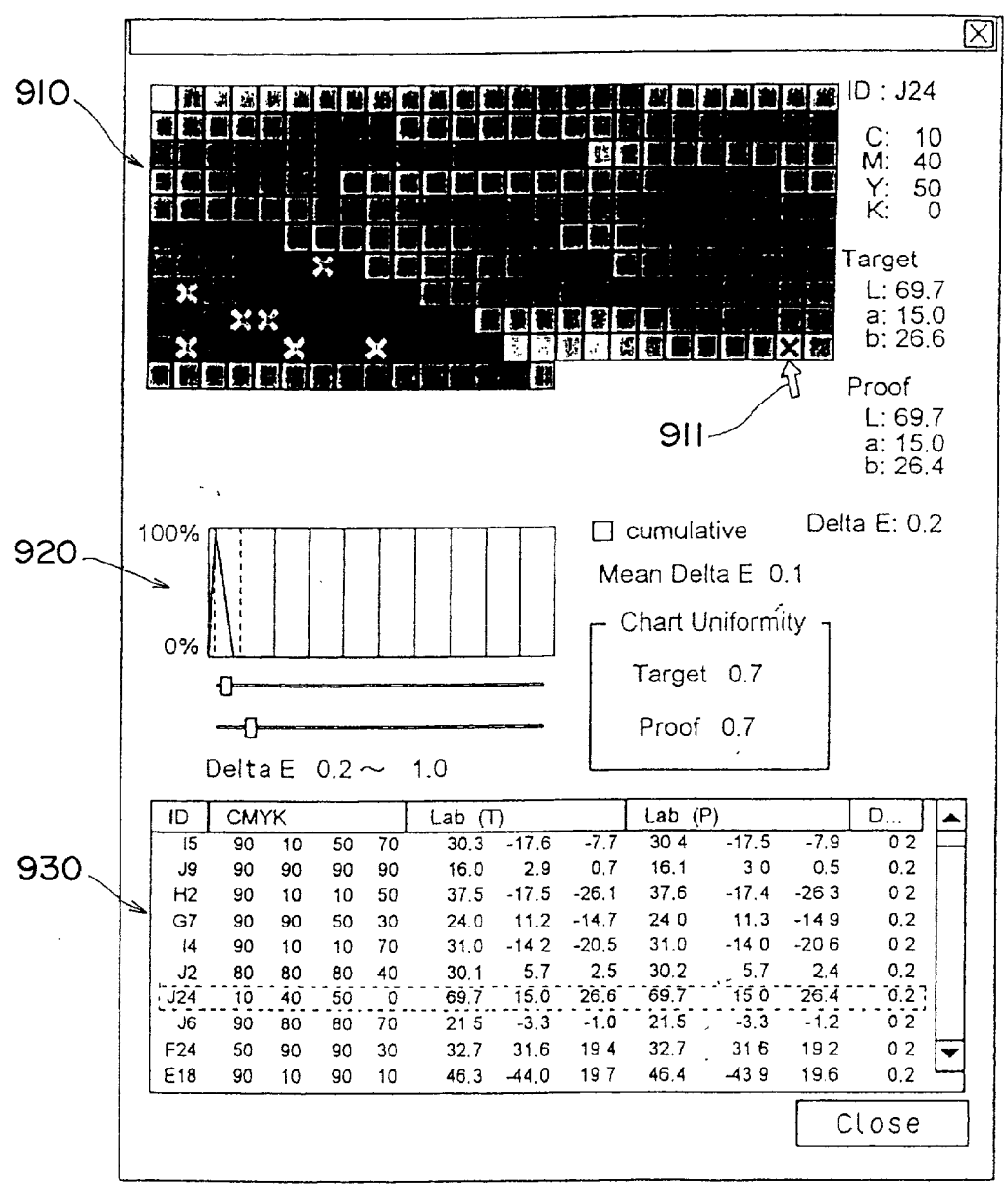
FIG. 9 is a view showing an example of an image displayed on a display screen of an image display unit.

FIG. 9 is a view showing an example of an image displayed on the display screen 82a (cf. FIG. 2) of the image display unit 82 by the image display section 812.

The image shown in FIG. 9 comprises a color chart display section 910, a frequency graph display section 920 and a detailed data display section 930.

The color chart display section 910 is a portion for displaying an image (here, this image is also referred to as a color chart) imaging the color chart used in the whole system shown in FIG. 1. When a mouse cursor 911 is placed on any one of a plurality of color patches constituting the color chart, at the neighbor on the right of the color chart, regarding the color patch designated by the mouse cursor 911, there are displayed an ID, CMYK values, L*a*b* values (Target) wherein the CMYK values are converted using the printing profile, L*a*b* values (Proof) wherein the CMYK values are converted using the printer profile, and a color difference (Delta E) between the Target and the Proof.

This display makes it possible to examine in detail a difference between the Target and the Proof for each of the color patches.

The frequency graph display section 920 displays a graph of frequency of the color difference between the Target and the Proof as to a plurality of color patches constituting the color chart. When "cumulative" at the right of the graph is operated, there is displayed a cumulative frequency graph rising right instead of the frequency graph shown in FIG. 9. In the column of "Mean Delta E" below the "cumulative", there is displayed the mean value of the color difference between the Target and the Proof as to the color chart in its entirety. In the column of "Chart Uniformity" below the "Mean Delta E", there is displayed uniformity of the color chart for each of the Target and the Proof. The numerical value here displayed is a color difference between color patches based on the same image data wherein color patches, which are the same in image data (CMYK values), are disposed at the mutually separated places on the color chart, and the color chart is outputted by the Target (the printing machine) or the Proof (the printer) in accordance with the image data and is subjected to a colorimetry. A difference due to position on the image of the print (the print output) of the output device (the printing machine or the printer) is smaller or more excellent in uniformity with smaller color difference.

Two slide bars below the frequency graph are to designate a desired color difference range. When the upper slide bar is moved through picking by the mouse, the minimum value of the color difference range is designated. When the lower slide bar is moved through picking by the mouse, the maximum value of the color difference range is designated. The color difference ranges designated by those two slide bars are displayed with vertical broken lines on the frequency graph and also displayed in form of numerical values below those two slide bars.

In this manner, when the color difference ranges are designated, there are displayed marks "X" which are applied to color patches within the designated color difference range, of a plurality of color patches constituting the displayed color chart. The color difference referred to here implies a color difference between two types of L*a*b* values which are obtained through conversion of CMYK values belonging to the color patch by both the printing profile and the printer profile.

According to the present embodiment, a designation of the range of the color difference in the manner as mentioned above makes it possible to confirm a color patch within a range of the color difference on the color chart, and thereby readily grasp coincidence or inconsistency of color reproduction characteristics between the Target (the printing machine) or the Proof (the printer).

The detailed data display section 930 displays, with respect to each of a plurality of color patches constituting the color chart displayed on the color chart display section 910, an ID designating the associated color patch, CMYK values belonging to the color patch, L*a*b* values (Lab (T)) wherein the CMYK values are converted using the printing profile, L*a*b* values (Lab (P)) wherein the CMYK values are converted using the printer profile, and a color difference (D) between those two types of L*a*b* values.

While color differences offer 0.2 only on the display screen in FIG. 9, as a whole of the detailed data, the color differences are arranged in the order from the smallest one to the largest one. Alternatively, it is acceptable that the color differences are arranged in the order from the largest one to the smallest one.

When the mouse cursor 911 is placed on any one of a plurality of color patches constituting the color chart, as mentioned above, at the right of the color chart, there is displayed data of the associated color parch and is also displayed on a reversed basis a display line (in FIG. 9 a line encircled with a dotted line) of the color patch designated by the mouse cursor 911, of the detailed data list displayed by the detailed data display section 930.

Search of the detailed data list makes it possible to examine in detail coincidence or inconsistency of color reproduction characteristics between the Target (the printing machine) and the Proof (the printer).

"Close" appearing at the lower right of FIG. 9 is a button for closing the screen through the mouse operation.

In the above embodiment of the present invention, referring to FIG. 9, there is described by way of an example a case where the printing machine 40 and the printer 60 shown in FIG. 1 are selected as the target (Target) and the proof (Proof), respectively, and coincidence or inconsistency of color reproduction characteristics between the Target and the Proof is examined. However, the present invention is not restricted to a comparison of the printing machine with the printer, and is applicable to for example a comparison of color reproduction characteristics among a plurality of printing machines in a system wherein the plurality of printing machines are set up, and a comparison of color reproduction characteristics among a plurality of printers in a system wherein the plurality of printers are set up.

Further, according to the system shown in FIG. 1, it is possible to create a profile of the color scanner 10 and use the profile of the color scanner 10 as one of two types of profiles to be compared with one another in the manner as mentioned above. To obtain the profile of the color scanner 10, the color scanner 10 is used to read a color chart having the same format as the color chart 90 shown in FIG. 2, instead of the original image 11 shown in FIG. 1, to generate image data of CMYK. The image data thus generated is read via a portable type of storage medium such as a floppy disk, or through the direct connection of the color scanner 10 with the personal computer 80, into the personal computer 80. Further, the color chart read by the color scanner 10 is subjected to a colorimetry by the spectrocolorimeter 70 to obtain calorimetric data of L*a*b*. The calorimetric data thus obtained is fed to the personal computer 80 so that the profile creating section 816 of the profile creation display apparatus 800 shown in FIG. 8, which is constructed in the personal computer 80, associates the image data for CMYK with calorimetric data for L*a*b* to create the profile of the color scanner 10. In order to compare the profile of the color scanner 10 thus created with the profile of the printing machine 40 or the profile of the printer 60, it is possible to display the profile of the color scanner 10 in a similar fashion to that of the above explanation. Alternatively, a method of creating the profile per se is not the subject of the present invention, it is acceptable that profiles of an input device and an output device, which are not illustrated in FIG. 1, for example, an electronic still camera and an image display device, are obtained and displayed, using one or both of the comparison and the evaluation of the obtained profiles, in the manner as mentioned above.

In this manner, according to the present invention, it is possible to deal with color reproduction characteristics of any type of devices, regardless of a sort of devices for inputting or outputting (including displaying) images.

While the above-mentioned embodiments relate to a display appearance of a profile dealing with a conversion between a CMYK color space and an L*a*b* color space, the present invention is not restricted to those embodiments. The present invention is also applicable to a case where there is displayed a profile defining a relationship between a RGB color space and an L*a*b* color space, or a relationship between a CMYK color space or a RGB color space and an XYZ color space.

As mentioned above, according to the present invention, it is possible to objectively examine and evaluate on data a degree of coincidence or inconsistency of color reproduction characteristics between two devices.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

an image display section for displaying a patch arrangement image in which there is arranged a plurality of patches associated with the coordinates of the first color space; and a patch designation section for designating a desired patch from among the plurality of patches constituting the patch arrangement image displayed on said image display section in accordance with an operation, wherein said image display section displays in addition to the patch arrangement image a coordinate value on the first color space associated with the patch designated by said patch designation section and information as to a distance between two coordinates on the second color space, said two coordinates being associated with said coordinate value and two sorts of devices as well.

2. A color reproduction characteristic display apparatus according to claim 1, wherein said image display section further displays coordinate values of the two coordinates on the second color space.

3. A color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

a distance range designation section for designating a distance range on the second color space in accordance with an operation; and an image display section for displaying a patch arrangement image in which there is arranged a plurality of patches associated with the coordinates of the first color space, and in addition, with respect to each of a plurality of color patches constituting the patch arrangement image, for displaying information as to whether a distance between two coordinates on the second color space, said two coordinates being associated with said coordinate value and two sorts of devices as well, is within the distance range designated by said distance range designation section.

4. A color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display apparatus comprising:

an image display section for displaying a patch arrangement image in which there is arranged a plurality of patches associated with the coordinates of the first color space, and in addition, with respect to each of a plurality of color patches constituting the patch arrangement image, for displaying a coordinate value on the first color space associated with the patch designated by said patch designation section and information as to a distance between two coordinates on the second color space, said two coordinates being associated with said coordinate value and two sorts of devices as well, with numerical values in order of the distance.

5. A color reproduction characteristic display apparatus according to claim 4, wherein said image display section displays with numerical values coordinate values of the two coordinates on the second color space with respect to each of a plurality of color patches constituting the patch arrangement image.

6. A color reproduction characteristic display apparatus according to claim 1, wherein said image display section displays, as the patch arrangement image, images simulating color chart images for evaluation of color reproduction characteristics inputted or outputted by said two sorts of devices.

7. A color reproduction characteristic display apparatus according to claim 3, wherein said image display section displays, as the patch arrangement image, images simulating color chart images for evaluation of color reproduction characteristics inputted or outputted by said two sorts of devices.

8. A color reproduction characteristic display apparatus according to claim 4, wherein said image display section displays, as the patch arrangement image, images simulating color chart images for evaluation of color reproduction characteristics inputted or outputted by said two sorts of devices.

9. A color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

an image display section for displaying a patch arrangement image in which there is arranged a plurality of patches associated with the coordinates of the first color space; and a patch designation section for designating a desired patch from among the plurality of patches constituting the patch arrangement image displayed on said image display section in accordance with an operation, wherein said image display section displays in addition to the patch arrangement image a coordinate value on the first color space associated with the patch designated by said patch designation section and information as to a distance between two coordinates on the second color space, said two coordinates being associated with said coordinate value and two sorts of devices as well.

10. A color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

a distance range designation section for designating a distance range on the second color space in accordance with an operation; and an image display section for displaying a patch arrangement image in which there is arranged a plurality of patches associated with the coordinates of the first color space, and in addition, with respect to each of a plurality of color patches constituting the patch arrangement image, for displaying information as to whether a distance between two coordinates on the second color space, said two coordinates being associated with said coordinate value and two sorts of devices as well, is within the distance range designated by said distance range designation section.

11. A color reproduction characteristic display program storage medium storing a color reproduction characteristic display program which causes a computer to operate as a color reproduction characteristic display apparatus for displaying color reproduction characteristics wherein an association between coordinates of a first color space defining a color on image data and coordinates of a second color space defining a color on an image are defined in accordance with a device for mediating between the image data and the image, said color reproduction characteristic display program comprising:

an image display section for displaying a patch arrangement image in which there is arranged a plurality of patches associated with the coordinates of the first color space, and in addition, with respect to each of a plurality of color patches constituting the patch arrangement image, for displaying a coordinate value on the first color space associated with the patch designated by said patch designation section and information as to a distance between two coordinates on the second color space, said two coordinates being associated with said coordinate value and two sorts of devices as well, with numerical values in order of the distance.

12. The color reproduction characteristic display apparatus according to claim 1, wherein said two sorts of devices comprise at least one of a first printer and a second printer wherein the color reproduction characteristics of said first printer and said second printer are different, a display apparatus and a scanner, a printer and a scanner, and a display apparatus and a printer.

13. The color reproduction characteristic display apparatus according to claim 1, wherein said first color space is a device dependent color space and said second color space is a colorimetry color space.

14. The color reproduction characteristic display apparatus according to claim 13, wherein said device dependent color space comprises cyan, magenta, yellow and black color values.

15. The color reproduction characteristic display apparatus according to claim 13, wherein said colorimetry color space comprises L, a and b values.

* * * * *